United States Patent [19]

Itoh

[11] Patent Number: 4,571,636
[45] Date of Patent: Feb. 18, 1986

[54] DEVICE FOR READING IMAGES OF BOTH SURFACES OF AN ORIGINAL IN ONE PASS

[75] Inventor: Satoru Itoh, Kanagawa, Japan

[73] Assignee: Fuji Xerox Co., Ltd., Tokyo, Japan

[21] Appl. No.: 563,834

[22] Filed: Dec. 21, 1983

[30] Foreign Application Priority Data

Dec. 21, 1982 [JP] Japan .................. 57-222904

[51] Int. Cl.⁴ .................. H04N 1/40; H04N 1/10
[52] U.S. Cl. .................. 358/285; 358/293; 271/258; 355/23
[58] Field of Search .................. 358/285, 293, 294; 271/258, 259; 355/23

[56] References Cited

U.S. PATENT DOCUMENTS

| 4,160,280 | 7/1979 | Stoji et al. | 358/294 |
| 4,266,251 | 5/1981 | Hara et al. | 358/286 |
| 4,424,535 | 1/1984 | Rothbart et al. | 358/285 |
| 4,429,333 | 6/1984 | Darris et al. | 358/293 |
| 4,465,272 | 8/1984 | Kajita et al. | 271/258 |
| 4,475,128 | 10/1984 | Koumura | 358/293 |
| 4,499,500 | 2/1985 | Nagashima | 358/293 |

Primary Examiner—James J. Groody
Assistant Examiner—John K. Peng
Attorney, Agent, or Firm—Sughrue, Mion, Zinn, Macpeak and Seas

[57] ABSTRACT

An original conveying-type image reading device includes first and second platens and first and second lamps for illuminating the platens. The first and second platens, as well as the first and second lamps, are disposed on opposite sides of an original conveying path so that the opposite sides of the original can be read as the original is transported through the device in one pass.

12 Claims, 1 Drawing Figure

DEVICE FOR READING IMAGES OF BOTH SURFACES OF AN ORIGINAL IN ONE PASS

BACKGROUND OF THE INVENTION

The present invention relates to an image reading device which uses a solid image pickup element to provide electrical signals indicative of a density of an image and, more particularly, to an image reading device which can read both surfaces of an original in one pass of the original through the device.

As is well known in the art, a conventional facsimile device contains only one original reading section. Accordingly, both surfaces of an original are read by, first, reading one of the two surfaces as the original is conveyed past the original reading section, and then the original is discharged from the device. Subsequently, the original is turned over and again conveyed past the original reading section so that the other surface can be read.

As is apparent from the above description, reading both surfaces of an original in a conventional facsimile device requires two passes of the original through the device. Therefore, the operation is cumbersome, and it takes a relatively long time to read both surfaces of an original.

SUMMARY OF THE INVENTION

Accordingly, an object of the present invention is to provide an image reading device in which the above-described difficulties are eliminated and in which both surfaces of an original can be read in one pass of the original through the device.

The specific feature of the present invention resides in an original conveying-type image reading device comprising: an original tray; a pair of feed rolls; an original conveying mechanism; a first platen; first illuminating means for illuminating the first platen; mirrors for reflecting a light beam which is reflected from one surface of an original that is brought to the first platen; and a lens for applying the light beam thus reflected to a sensor in order to form the image of the one surface on the sensor. The sensor converts the image into electrical signals, and a second platen is provided at a distance from the first platen which is larger than a maxiimum length of an original which is handled by the device. A second illuminating means for illuminating the second platen is provided on one side of an original conveying path which is opposite to the side of which the first platen is provided, and a light beam, which is reflected from the other surface of the original that is brought to the second platen, is applied through the lens to the sensor by stationary mirrors and by a movable mirror, a half-mirror or a prism. Thus, the images of both surfaces of an original are read in one pass of the original through the device.

DESCRIPTION OF THE PREFERRED EMBODIMENTS

Figure 1:
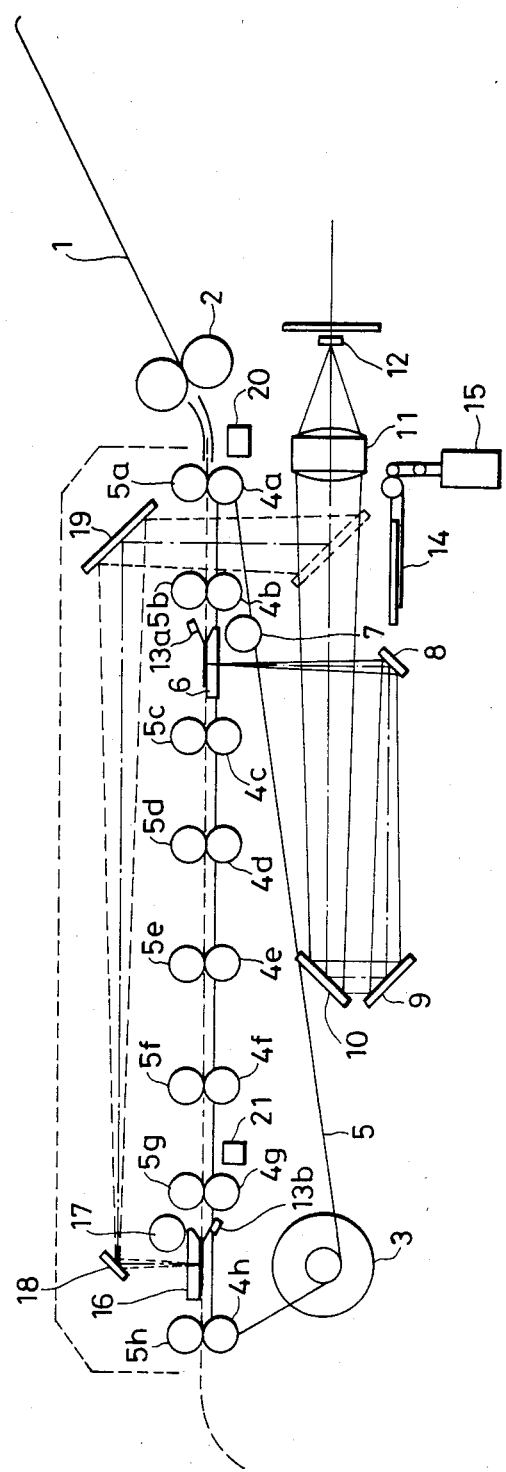
FIG. 1 is an explanatory diagram outlining the arrangement of one embodiment of the present invention.

A plurality of originals on an original tray 1 are fed, one-by-one, by feed rolls 2 from the bottom of a stack of originals. Each original is conveyed at a constant speed by a plurality of drive rolls 4a–4h which are driven by a motor 3 and a belt 5, and by idler rolls 5a–5h which abut against the drive rolls 4a–4h, respectively. When an original reaches a first glass platen 6 (hereinafter referred to as "a platen"), the original is pushed against this platen by an original retainer 13a. As the original passes the first glass platen 6, the surface of the original is illuminated by a first lamp 7. A light beam which is reflected from the original is reflected by first, second and third mirrors 8, 9 and 10 so that the image of the original's surface is formed on a sensor 12 by a lens 11. The sensor 12 comprises, for instance, a self-scanning-type linear sensor which contains a plurality of photoelectric conversion elements that output electrical signals indicative of the density of an original. Accordingly, as the original passes the first platen 6, the sensor 12 reads the entire surface of the original.

When the original has passes the first platen 6, a solenoid 15 causes a movable mirror 14 to rise to a position indicated by the dotted line. As the original passes a second platen 16, the rear surface of the original is illuminated by a second lamp 17. A light beam which is reflected from the rear surface of the original is reflected by fourth and fifth mirrors 18 and 19 and by the movable mirror 14 so that the image of the rear surface of the original is formed on the sensor 12, and the sensor 12 outputs electrical signals according to the image thus formed. Accordingly, as the original passes the second platen 16, the rear surface of the original is read.

The distance between the centers of the first and second platens 6 and 16 should be maintained larger than the maximum length of an original to be read by the device.

The first and second lamps 7 and 17 are turned on by output signals which are generated by first and second position detectors, respectively. Furthermore, of the electrical signals that are provided by the photoelectric conversion of the sensor 12, those which are provided when the original is read are determined by the output signals of the first and second position detectors 20 and 21. In particular, when an original passes each of the first and second position detectors 20 and 21, each position detector detects the front edge of the original in order to output a detection signal.

The distance L1 between the reading scanning-line position of the first platen 6 and the detecting position of the first position detector 20 is measured, and the distance L2 between the reading scanning-line position of the second platen 16, and the detecting position of the second position detector 21 is also measured, and the original is conveyed at a constant speed V. Therefore, the period of time T1 which elapses from the instant that the original passes the first position detector 20 until it reaches the first platen 6, and the period of time T2 which elapses from the instant that the original passes the second position detector 21 until it reaches the second platen 16, are as follows:

$T1 = L1/V$ $T2 = L2/V$

A timer (not shown) is operated by the output signals of the first and second position detectors 20 and 21, and this timer provides signals which are gated by the photoelectric conversion signals from the sensor 12 in order to obtain original-read signals.

A suitable example of each of the first and second position detectors 20 and 21 is a reflectiontype or transmission-type detector which comprises an LED (light-emitting diode) and a photo-transistor. Alternatively, the position detectors may be replaced by micro-switches.

In the above-described embodiment, the number of mirrors in a first optical path from the first platen to the lens is equal to the number of mirrors in a second optical path from the second platen to the lens. Accordingly, the quantity and intensity of light in the first optical path is equal to the quantity and intensity of light in the second optical path. Since the lens and the sensor are provided beneath the original conveying system, the number of components which are provided above the original conveying system is small. Accordingly, when the original is caught in the original conveying system, the original conveying system can readily be opened from above.

While the present invention has been described with reference to its preferred embodiment, it should be noted that the invention is not limited to or by this embodiment. That is, the embodiment can be modified as follows:

(1) In the above-described embodiment, the movable mirror 14 for introducing the light beam reflected from the first or second platen 6 or 16 is driven by the solenoid 15. However, the movable mirror 14 may be replaced by a half-mirror or a prism. In this case, the number of mirrors in the first optical path from the first platen 6 to the lens 11 is different than the number of mirrors in the second optical path from the second platen 16 to the lens 11. Accordingly, the quality and intensity of light in the first and second optical plaths are different from each other, and it is necessary to insert a filter in one of the optical paths in order to adjust the quantity of light or to adjust the mirror reflectivity.

(2) In the above-described embodiment, the original conveying system employs the rolls for conveying originals; however, the original conveying system may employ a belt between the first and second platens 6 and 16.

(3) The distance between adjacent rolls 4a, 4b is required to be relatively long where the optical path from the second platen 16 crosses the conveying system (or between the drive rolls 4a and 4b). Accordingly, the original may become slack in this area. In order to prevent this, a guide for conveying originals is provided between these rolls in such a manner that the guide is operated in association with the movable mirror 14. More specifically, when the original is read at the first platen 6, the movable mirror 14 is set at the position that is indicated by the solid line, while the guide is set between the rolls. When the original is read at the second platen 16, the movable mirror 14 is set at the position that is indicated by the broken line, while the guide is set away from the rolls.

(4) The solenoid 15 may be replaced by a motor.

As is apparent from the above description, according to the present invention, the images of the front and rear surfaces of an original can be read in one pass of the original through the device. Therefore, the reading operation is simple and can be achieved in a short time. Since the lens and the sensor are used for reading both the front and rear surfaces of an original, the image reading device of the present invention can be composed of a relatively small number of components.

I claim:

1. An image reading device, comprising:
    first and second platens located on opposite sides of a conveying path on an original, said first and second platens being separated along a lengthwise direction of said path by a distance which is longer than a maximum length of an original to be read;
    means for feeding and conveying an original past said first and second platens;
    first and second illuminating means for illuminating said first and second platens, respectively;
    a single sensor means;
    lens means disposed in front of said sensor means; and
    mirror means for successively reflecting a light beam reflected from first and second surfaces of an original being conveyed past said first and second platens through said same lens means, said lens means thereby successively forming an image of said first and second surfaces on said same single sensor means, which converts said images into electrical signals, said first and second surfaces being on opposite sides of said original.

2. The device as claimed in claim 1, wherein said mirror means includes a plurality of fixed mirrors, a movable mirror, and means for moving said movable mirror, said movable mirror being moved out of a path of reflected light reflected from said first original surface, said movable mirror being moved to reflect light reflected from said second original surface towards said lens means when said second illuminating means illuminates said second platen.

3. The device as claimed in claim 1, wherein said mirror means includes a plurality of fixed mirrors and a half-mirror, said half-mirror transmitting reflected light reflected from said first original surface towards said lens means and reflecting light reflected from said second original surface towards said lens.

4. The device as claimed in claim 1, wherein said mirror means includes a plurality of fixed mirrors and a prism.

5. The detector as claimed in claim 1, wherein said mirror means includes a plurality of fixed mirrors, a prism, and a filter for adjusting a quality of light reflected from one of the original surfaces.

6. The device of claim 1, wherein said feeding and conveying means comprises:
    a tray for holding a plurality of originals to be read;
    a pair of feed rollers for feeding said originals from said tray; and
    a conveying mechanism for conveying originals fed by said feed rolls past said first and second platens.

7. The device as claimed in claim 6, wherein said original conveying mechanism comprises a plurality of drive rollers which confront a plurality of idler rollers, and a motor and a belt for driving said drive rollers.

8. The device as claimed in claim 1, further comprising a guide for guiding said original as it is conveyed to said first platen, means for moving said guide out of a path of light reflected from said second original surface when said second illuminating means illuminates said second platen.

9. The device as claimed in claim 8, wherein said mirror means includes a movable mirror which is moved in conjunction with said guide.

10. The device as claimed in claim 1, further comprising first and second position detectors for activating said first and second illuminating means when an original to be read is being conveyed in a vicinity of said first and second platens, respectively.

11. The device as claimed in claim 10, wherein said position detectors each comprise a light-emitting diode and a photo-transistor.

12. The device as claimed in claim 10, wherein said position detectors each comprise micro-switches.

* * * * *